UNITED STATES PATENT OFFICE.

GRAHAM H. HAMRICK, OF PHILIPPI, WEST VIRGINIA.

PROCESS OF MANUFACTURING BUTTER.

SPECIFICATION forming part of Letters Patent No. 450,459, dated April 14, 1891.

Application filed August 4, 1890. Serial No. 360,986. (No specimens.)

*To all whom it may concern:*

Be it known that I, GRAHAM H. HAMRICK, a citizen of the United States, residing at Philippi, in the county of Barbour and State of West Virginia, have invented certain new and useful Improvements in Processes of Manufacturing Butter; and I do declare the following to be a full, clear, and exact description of the invention, such as will enable others skilled in the art to which it appertains to make and use the same.

It is the object of my invention both to shorten and improve the process of making butter by drawing the cream and causing it to rise more quickly and thoroughly, and also to add greatly to the keeping properties of the product.

To this end my improvement consists in the employment of sulphurous-acid gas at that stage in the manufacture of butter at which the cream is separated from the milk, the said gas being applied in contact with the milk by adding to the latter water in which the gas has been absorbed, preferably by the burning of sublimed sulphur in a closed vessel containing the water.

This invention is an improvement upon that described and claimed in my patent, No. 433,729, of August 5, 1890, the result attained being that the milk, cream, or butter will have no taste whatever to be removed by a subsequent operation, or much less taste than when treated by the gas directly, as set forth in my said patent.

In order to make my invention more clearly understood, I will now describe a practical manner of carrying the same into effect. A quantity of clean water is first placed in a suitable vessel or inclosure, which is preferably air-tight and which has above the surface of the water a chamber or space. I then charge this chamber with sulphurous-acid gas either by conducting the gas to the chamber from some source of supply by a pipe, or, as will be more convenient in some cases, by burning a small quantity of sublimed sulphur in the chamber. For each gallon of water a table-spoonful of sulphur may be so burned and will produce the necessary amount of gas. I prefer to burn this one table-spoonful at a time, the gas to remain in contact with the water for a suitable length of time—say one hour—during which the water may either remain quiescent or may be slightly stirred or agitated. I then add one-half pint of the water thus treated to each gallon of milk and set it aside for the cream to rise. This latter action will take place much more rapidly, and the cream and butter made from it will keep much longer than usual. The cream having been churned in the ordinary manner, the butter is salted in the usual way and placed in a suitable receptacle, such as a stone jar. I then charge water, as above described, by using one tea-spoonful of sulphur to the gallon, and to each gallon I add one and one-half pound of clean salt, one-half pound of granulated sugar, and one-half ounce of crystallized saltpeter dissolved in water. I boil and skim this solution, and when it is cold cover the butter in the jar with it.

Having thus described my invention, what I claim as new, and desire to secure by Letters Patent of the United States, is—

The herein-described method of facilitating the drawing or raising of cream from milk, which consists in adding to the milk water which has been treated with sulphurous-acid gas, substantially as set forth.

In testimony whereof I affix my signature in the presence of two witnesses.

GRAHAM H. HAMRICK.

Witnesses:
 H. N. LOW,
 E. K. STURTEVANT.